Dec. 7, 1943. T. L. FAWICK 2,335,926
REVERSE-GEAR TRANSMISSION
Filed Aug. 8, 1940 2 Sheets-Sheet 2

INVENTOR
Thomas L. Fawick
BY
Willard D. Eakin
ATTORNEY

Patented Dec. 7, 1943

2,335,926

UNITED STATES PATENT OFFICE 2,335,926

REVERSE-GEAR TRANSMISSION

Thomas L. Fawick, Akron, Ohio

Application August 8, 1940, Serial No. 351,874

3 Claims. (Cl. 74—377)

This invention relates to reverse gear transmissions. Some of the features disclosed in the present application are more broadly described and claimed in my United States Patent No. 2,187,967, granted January 23, 1940, an application for the reissue of which was filed on April 22, 1940, Serial No. 331,060, which resulted in Reissue Patent No. 21,630, granted Nov. 26, 1940.

The chief objects of the present invention are to provide simplicity of construction, compactness, ease of assembly and disassembly, and effective exclusion of dirt, water and other foreign matter from the bearings, clutches and gearing; to provide those advantages in conjunction with speed reduction; and to provide improved friction-clutch means and positive clutch means in combination, the friction-clutch means being adapted not only to synchronize the positive-clutch means, but also on occasion to sustain the full driving load, which is desirable in marine service, for example, for starting and maneuvering the craft by friction clutch means and then bringing the positive-clutch means into effect for sustained driving.

Figure 1:
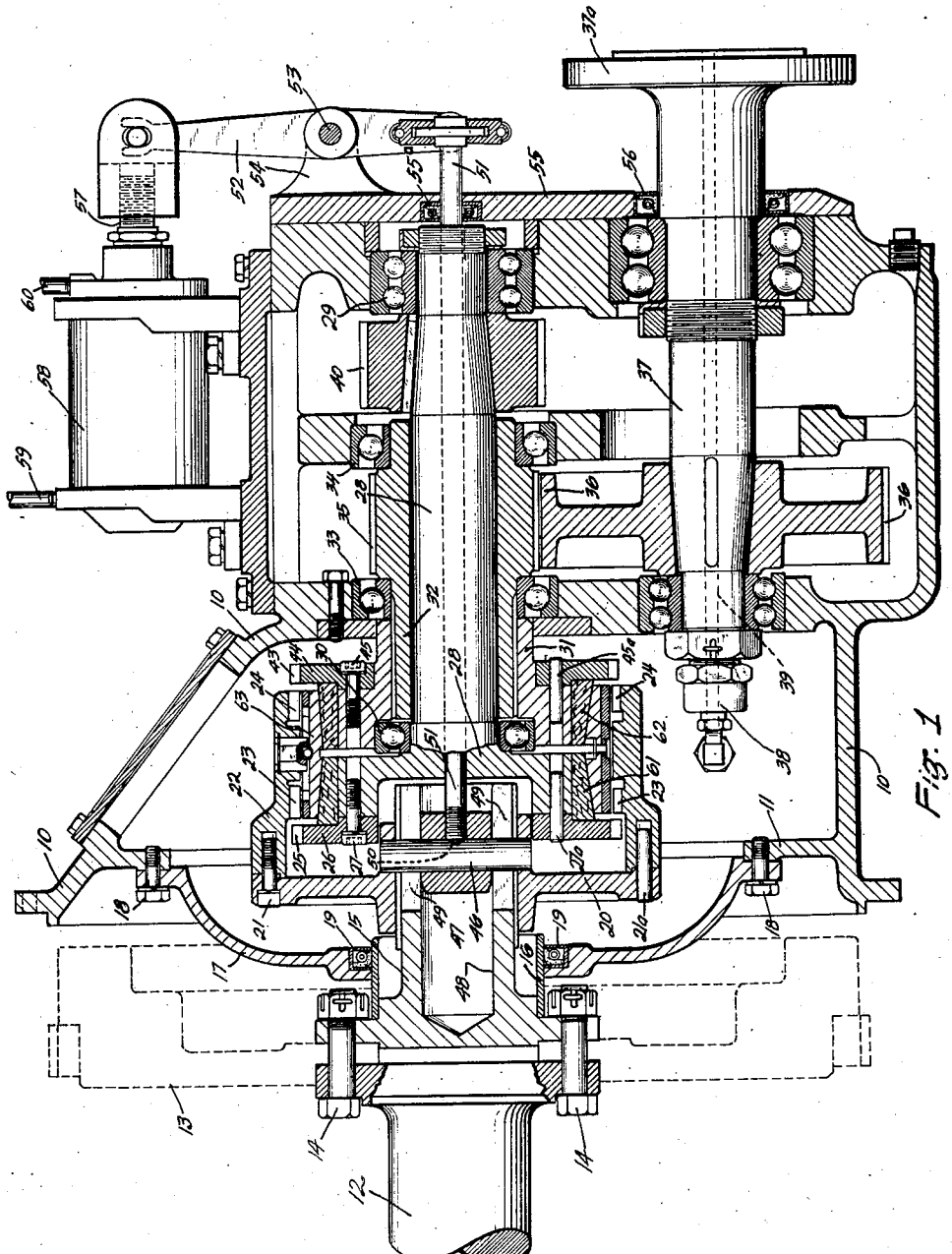
Fig. 1 is a longitudinal, vertical, middle section of a reverse-gear transmission embodying my invention in its preferred form.
Figure 2:
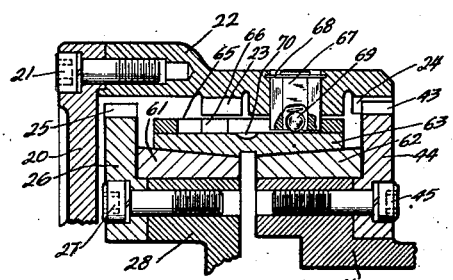
Fig. 2 is a corresponding view, on a larger scale, of parts of the mechanism as shown in Fig. 1.
Figure 4:
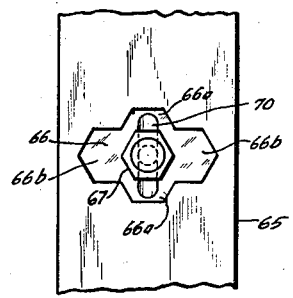
Fig. 4 is a fragmentary face view of some of the parts that are shown in Fig. 3.

Referring to the drawings, the assembly comprises a gear case 10 having a centering and attachment flange 11 adapting it to be secured to the frame or housing of a motor, of which the crank-shaft is shown at 12 and the fly-wheel at 13.

Secured in axial alignment with the crank-shaft 12, permissibly by the same bolts, 14, 14, which secure the fly-wheel to the crank-shaft, is a splined stub-shaft 15 which functions as an extension of the crank-shaft. A cylindrical sleeve member 16 is at one of its ends press-fitted upon a shoulder formed upon the stub-shaft 15 and is thus adapted to rotate in the central aperture of an end-closure plate 17 which at its outer periphery is secured to the gear case 10 by bolts 18, 18 and at its inner periphery is provided with an oil-seal 19, sealing against the outer face of the sleeve 16 for preventing escape of oil from the gear case and entrance of foreign matter into it.

Slip-splined upon the stub-shaft 15 is the hub of a rotary member 20 which at its outer periphery has secured thereto by means of bolts 21 and dowels 21ª a generally cylindrical jaw-clutch member 22 which internally is formed with two spaced-apart sets of clutch-teeth 23, 24.

The internal clutch-teeth 23 are adapted to be meshed, by relative axial movement, with a complemental set of external clutch-teeth 25 formed on a ring 26 which is secured by bolts 27 and dowels 27ª to the head of a reverse-drive shaft 28 which is journaled at its far end in the rear wall of the gear case 10, by means of a radial-and-thrust bearing 29, and at its near end is journaled, by means of a radial-and-thrust bearing 30, in a forward-drive member 31 which is splined upon a forward-drive quill 32 surrounding the reverse-drive shaft 28, the quill being journaled in internal webs of the gear case by means of radial-and-thrust bearings 33, 34 and formed with a direct-drive pinion 35 which is in constant mesh with a gear 36 secured upon a driven shaft 37 suitably journaled in the case 10 and formed at its rear end with a head 37ª adapting it to be secured, either directly or through intermediate means such as a fluid-actuated clutch (not shown) with a driven member such as the propeller-shaft of a boat. The shaft 37 may be axially bored and provided with fluid connections such as an air-seal 38 and a fluid-supply line 39, preferably leading from the same source of fluid supply as the pipes 59 and 60 hereinafter described, for actuating such a clutch.

Figure 5:
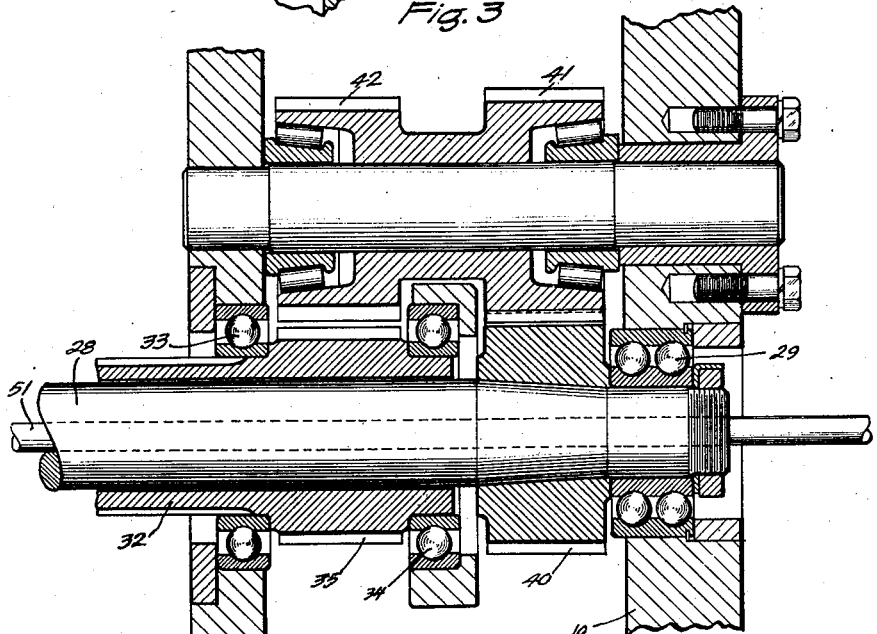
Fig. 5 is an axial section of some of the parts that are shown in Fig. 1 and of a reverse-idler assembly associated therewith.

Secured upon the reverse-drive shaft 28 is a pinion 40 which is constantly meshed with one pinion, 41, of a pair of twin idler pinions 41, 42 (Fig. 5), of which pinion 42 is constantly meshed with the gear 36.

The arrangement as thus described is such that the forward-drive quill 32 and the reverse-drive shaft 28 must always rotate in opposite directions.

For positive forward drive of the forward-drive quill 32 the internal clutch-teeth 24 of the clutch member 22 are adapted to mesh with external clutch-teeth 43 formed on a ring 44 which is secured by bolts 45 and dowels 45ª upon the splined member 31.

For moving the clutch member 22 axially of the assembly for selectively meshing its clutch-teeth 23 with the teeth 25 or its teeth 24 with the teeth 43, or through a less range for selective engagement only of friction-clutch members presently to be described, the hub of the member 20 has mounted therein a bridge pin 46 which extends also through a slide block 47 which is mounted in a bore 48 formed in the stub-shaft 15, the pin extending through and being axially slidable in axially disposed slots 49, 49 formed in the walls of the stub shaft.

The slide block 47 is formed with a threaded, axially disposed bore extending to the transverse bore in which the pin 46 is mounted and the pin is formed with a conical recess 50 adapted to receive the conical end of a rod 51 which extends through an axail bore in the reverse-drive shaft 28 and is threaded into the threaded hole of the slide block 47, this arrangement being adapted for easy assembly with secure holding of the pin against lengthwise sliding movement.

At its rear end the rod 51 is swiveled in one arm of a two-armed lever 52 which is fulcrumed at 53 in a forked bracket 54 projecting from an end-closure plate 55 which is suitably secured to the gear case 10 and provided with oil seals 55ª, 56 for the driven shaft 37 and the clutch-actuating rod 51.

The other arm of the lever 52 is forked and has pin-and-slot connection with the piston rod 57 of a clutch-actuating two-way cylinder 58 mounted upon the gear case 10 and provided with supply-exhaust pipes 59, 60.

The friction-clutch means above referred to comprises inner cone-clutch members 61, 62 secured respectively upon the head of the reverse-drive shaft 28 and upon the forward-drive member 31 and tapered toward each other, and an outer cone-clutch ring 63 formed with oppositely flared internal faces adapted to be brought into engagement with the cone-clutch members 61 and 62 selectively by relative axial movement.

Figure 3:
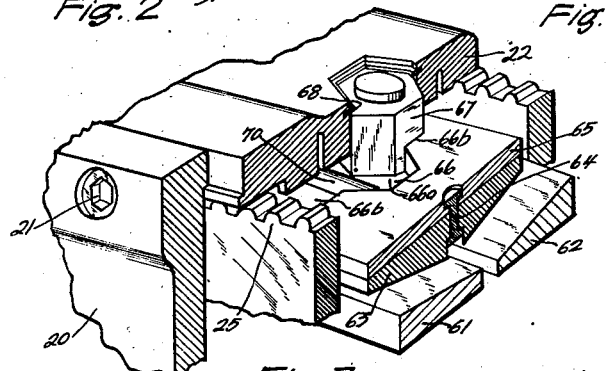
Fig. 3 is a perspective view, with parts in section, of some of the parts that are shown in Fig. 2.

Secured upon the outer face of the outer cone-clutch member 63 by means such as the rivet 64, Fig. 3, is a ring 65 formed with a generally cross-shaped hole 66 having, opposite each other, in the line of rotation, trapezoidal bays such as the bay 66ª, each adapted to receive, with a snug fit but without positive interlock against relative axial movement, three adjacent sides of a hexagonal stud 67 and, opposite each other in an axial direction, deeper bays 66ᵇ, 66ᵇ adapted to receive with a snug fit and with a positive interlock against relative circumferential movement four adjacent sides of the hexagonal stud 67.

The stud 67 is mounted in a complemental hexagonal hole in the jaw-clutch member 22 and retained therein by a snap-ring 68.

This arrangement is such that when the jaw-clutch member 22 is being driven and is in its middle, neutral position, with its teeth out of mesh, it will carry the stud into one of the trapezoidal bays 66ª and thus compel the friction-clutch ring 63 to rotate with it. Axial movement of the jaw-clutch member then causes the friction clutch member to move with it and engage and drive one or the other, according to the direction of axial movement, of the friction-clutch members 61, 62, before it has been moved so far as to engage its clutch teeth 23 or 24, with the driven structure, the angle of the side walls of the bay 66ª preferably being such as to compel the friction-clutch member 63 to move axially with the jaw-clutch member 22 until the friction clutch members sustain full driving load, with the adjacent friction-clutch and jaw-clutch members rotating at the same speed.

Further axial movement of the jaw-clutch member 22 in the same direction then causes the stud 67 to slide out of the bay 66ª, along the obliquely disposed wall of the latter, and to enter the adjacent bay 66ᵇ, in which it is positively interlocked against relative rotary movement, and this operation brings the clutch-teeth into mesh.

Movement of the clutch member 22 back to its middle position unmeshes the clutch teeth and permits the friction clutch member 63 to return to middle position, where it is held by the stud 67 entering one or the other of the bays 66ª, according to relative speeds as determined by external and internal frictional contacts of the ring assembly 63, 65, until the member 22 is again moved from its middle position.

To assure a sufficiently strong drag of the floating cone-clutch structure along with the jaw-clutch member in the latter's axial movement to obtain initial frictional driving engagement strong enough to cause the stud 67 to enter the bay 66ª as above described, a spring backed ball-detent 69 is mounted in a recess in the stud 67 and is adapted to coact with the walls of a short groove 70 formed in the floor of the recess 66, that floor being the outer face of the member 63, this detent being adapted to hold the two structures in medial alignment or symmetrical relation when they are not being so held by the stud 67 in one of the bays 66ª.

The mode of operation and the advantages set out in the above statement of objects will be entirely clear from the foregoing description and specific points as to facility of assembly and disassembly will be manifest upon contemplation of the drawings.

It may be noted, for example, that the four coaxial structures inclusive respectively of the members 28, 32, 31 and 22 can be readily associated with their bearings and with each other by relative axial movement and then by relative axial movement, they as a unit can be readily mounted in the gear case. Thereafter, they and the gear case as a unit can be mounted upon the stub-shaft 15 and the gear case secured to the motor frame or housing.

An advantage of having the fluid control for both the reversing clutches and a clutch mounted upon the shaft 37 is that the latter can readily be de-clutched just before and re-engaged just after the reversal of the direction of rotation of the shaft 37.

Various modifications are possible within the scope of the invention as defined by the appended claims.

I claim:

1. A reverse-gear transmission comprising a driving shaft, a driven shaft, and forward and reverse driving means interposed operatively between the two, said means comprising coaxial forward and reverse shafts one within the other, gearing connecting the forward and reverse shafts and compelling them to rotate in opposite directions, juxtaposed, axially engageable clutch members on the said coaxial shafts respectively, axially-engaging clutch means slidably but non-rotatably mounted on one of the two first-mentioned shafts and adapted to be engaged selectively with the said clutch members by relative axial movement, and mechanical clutch-actuating means extending lengthwise through the coaxial shafts for effecting such engagement, the shaft on which said clutch means is mounted being formed with a longitudinal bore and a longitudinal slot in its wall and the clutch-actuating means comprising a member slidably mounted in said bore and said slot.

2. A reverse-gear transmission comprising coaxial forward and reverse shafts one within the other, gearing connecting the forward and reverse shafts and compelling them to rotate in opposite directions, juxtaposed clutch members on said shafts respectively, a clutch structure adapted to be engaged selectively with the said clutch members and including a splined hub, a frame structure supporting all of the said parts as a portable unit, said frame being provided with means for securing it to the frame of a motor, and the said splined hub being adapted to fit onto a shaft of the motor when the said unit is presented to the frame of the motor.

3. A reverse-gear transmission comprising a transmission housing and a reverse-gear therein including a hub member having open-end, slip-connection, driving means adapting it to be connected to a shaft of a motor in driving relation thereto by simple axial sliding movement, the housing including an end-closure member having an opening coaxial with said hub member, in combination with a motor shaft having, in fixed relation thereon, open-end slip connection, driving means mating with said hub member, and having in fixed relation thereon closure means fitting into the opening of said end-closure member, by simple, axial, sliding movement.

THOMAS L. FAWICK.